United States Patent Office 2,954,366
Patented Sept. 27, 1960

---

2,954,366

COPOLYMERS OF A POLYMERIZABLE BORAZOLE

Joseph J. Pellon, Byram, Conn., assignor to American Cyanamid Company, New York, N.Y., a corporation of Maine No Drawing. Filed Feb. 21, 1958, Ser. No. 716,559

14 Claims. (Cl. 260—85.7)

This invention relates to the production of new materials having valuable and characteristic properties that make them especially suitable for use in industry, for example, in molding, coating, laminating, impregnating, textile-treating, and adhesive applications, as cross-linking agents, as neutron absorbers, gelling agents, and for other purposes. More particularly, the invention is concerned with compositions or products comprising a copolymer (or copolymers) of an unsaturated borazole.

The borazoles used in practicing the present invention may be represented graphically by the following general formula I
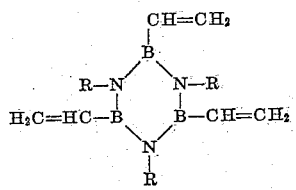

where R represents a member of the class consisting of hydrogen and alkyl (including cycloalkyl), aralkyl, aryl, and alkaryl radicals.

Illustrative examples of hydrocarbon radicals represented by R in the above formula are: methyl, ethyl, propyl, isopropyl, butyl, isobutyl, sec.-butyl, amyl, isoamyl, hexyl to tetracontyl, inclusive (both normal and isomeric forms), cyclopentyl, cyclohexyl, cycloheptyl, etc.; benzyl, phenylethyl, phenylpropyl, phenylisopropyl, phenylbutyl, fluorenyl, dinaphthylenemethyl, etc.; phenyl, biphenylyl or xenyl, naphthyl, anthryl, naphthyl-substituted anthryl and dianthryl, etc.; and tolyl, xylyl, ethyl phenyl, propylphenyl, isopropylphenyl, butylphenyl, etc.

The compositions of the present invention comprise a copolymer which is the product of polymerization of a mixture (polymerizable mixture) of copolymerizable ingredients including (1) a compound of the kind embraced by Formula I and (2) a substance which is different from the compound of (1), is copolymerizable therewith, and contains a >C=C< grouping, that is, a single >C=C< grouping or a plurality of such groupings. The ingredients of (1) and (2) are present in the aforementioned mixture in the ratio of from 0.1 to 75, more particularly from 1 to 70, molar percent of the former to from 99.9 to 25, more particularly from 99 to 30, molar percent of the latter. Illustrative examples of the substances of (2) are styrene, dimethyl styrene, methyl acrylate, methyl methacrylate, ethyl methacrylate, vinyl acetate, acrylonitrile, acrylamide, diallyl phthalate, triallyl citrate, tetralyl silane, dimethyl itaconate, diethyl maleate, dipropyl fumarate, unsaturated alkyd resins, etc. The scope of the invention also includes method features whereby new and useful synthetic compositions are produced.

The copolymers of this invention are unique in that they contain both ring boron and ring nitrogen combined in the polymer molecule. The boron tends to improve the flame-resisting properties of these polymers as compared with similar polymers in which boron is absent. They are further characterized by their improved thermal stability as compared with most of the other presently available polymers; and by their utility as, for example, neutron absorbers and scintillation counters.

It is one of the primary objects of the present invention to prepare a new class of copolymers for use in industry.

Still another object of the invention is to prepare new boron-containing copolymers.

Another object of the invention is to improve the usefulness of unsaturated borazoles of the kind embraced by Formula I whereby their field of utility is enhanced.

Other objects of the invention will be apparent to those skilled in the art from the following more detailed description.

Unsaturated borazoles of the kind embraced by Formula I are believed to be new chemical compounds. They are more fully described and are broadly and specifically claimed in the copending application of Stephen J. Groszos and Stanley F. Stafiej, Serial No. 716,542, filed concurrently herewith as a continuation-in-part of their copending applications Serial Nos. 647,934, now Patent No. 2,892,869; 647,935; and 647,936, now abandoned, filed March 25, 1957.

A preferred compound used in practicing this invention is B,B',B''-trivinyl-N,N',N''-triphenylborazole, the formula for which is II
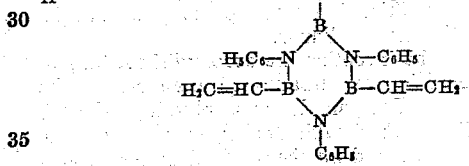

This compound also may be designated as B-trivinyl-N-triphenylborazole. Other compounds embraced by Formula I that are useful in practicing this invention (and which, for purpose of brevity, are named by the shorter nomenclature just indicated) include, for example, the following:

B-trivinyl-N-tritolylborazole
B-trivinyl-N-trimethylborazole
B-trivinyl-N-tribenzylborazole
B-trivinyl-N-tricyclohexylborazole
B-trivinyl-N-trixylylborazole
B-trivinyl-N-trioctadecylborazole
B-trivinylborazole, the formula for which is III
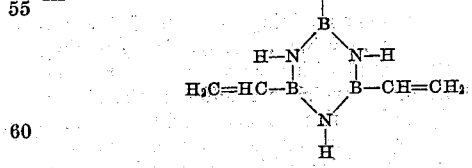

The compounds of this invention can be prepared by different methods. One suitable method comprises the dropwise addition of the appropriate Grignard reagent, R'MgX, where R' represents the vinyl radical, $CH_2=CH-$, and X represents a halogen, specifically Cl, Br, or I, to a slurry of the appropriate B,B',B''-trichloroborazole suspended in a suitable liquid solvent that is inert during the reaction, e.g., ethers, dioxane, tetrahydrofuran, aromatic and aliphatic hydrocarbons, chlorobenzene, etc.

The trichloroborazole employed is one represented by the general formula

IV
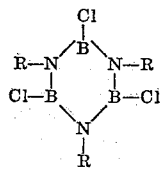

where R has the same meaning as that given above with reference to Formula I.

The addition of the Grignard reagent to the suspension of the trichloroborazole can be carried out at temperatures of, for example, from about 1° or 2° C. up to the boiling point of the particular solvent employed. After addition of the Grignard reagent over a period of up to about 3 hours, e.g., from about ½ to 2 hours, is complete, the reaction mass is allowed to reflux or is kept at a temperature at or above room temperature for a period of from a few minutes to several hours. After cooling to room temperature (if not already at that temperature) the unconsumed Grignard reagent is removed by any suitable means, e.g., by treating the mass with a suitable material that will react with the excess Grignard reagent. One example of such a material is an aqueous solution of an acid, for instance HCl.

Another procedure for obtaining the desired product from the reaction mass is to remove the solvent by distillation under vacuum, and to take up the resulting solid in hot hexane or the like. The hexane solution is then washed with a small amount of water, dried and concentrated to a volume such that the vinyl-substituted borazole separates on cooling. This is then filtered off and dried. An additional amount of product can be obtained from the mother liquor.

The objects of the invention are accomplished, in general, by polymerizing an unsaturated borazole of the kind embraced by Formula I, or a plurality of such borazoles, while admixed with one or more (e.g., two, three, five, or any desired number) of other unsaturated substances which are copolymerizable therewith, examples of which have been given hereinbefore. The copolymer advantageously is produced by, for instance, polymerizing the unsaturated borazole admixed with one or more other unsaturated materials under heat and with the aid of a polymerization catalyst or catalysts, or a catalyst system, using proportions of ingredients within the ranges hereinbefore mentioned. The substance that is copolymerized with the unsaturated borazole contains one or more >C=C< groupings, more particularly one or more —CH=C< groupings, and still more particularly one or more CH$_2$=C< groupings; or the copolymerizable substance having a >C=C< grouping can be, for example, a polymerizable unsaturated alkyd resin containing a plurality of

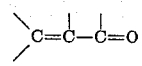

groupings.

Examples of monomers containing a —CH=C< grouping, including those containing a CH$_2$=C< grouping, that can be copolymerized with a compound of the kind embraced by Formula I, which are different therefrom, and which can be polymerized either singly or with a plurality (two, three, four, or any desired number) thereof, the latter often being desirable in order to improve the compatibility and copolymerization characteristics of the mixture of monomers and to obtain new and valuable copolymers having the particular properties desired for a particular service application, are such monomers as the unsaturated alcohol esters, more particularly the vinyl, isopropenyl, allyl, methallyl, crotyl, 1-chloroallyl, 2-chloroallyl, cinnamyl, 1-phenylallyl, butenyl, etc., esters of saturated and unsaturated, aliphatic and aromatic, monobasic and polybasic acids such, for instance, as acetic, propionic, butyric, valeric, caproic, acrylic and alpha-substituted acrylic (including alkacrylic, e.g., methacrylic, ethacrylic, propacrylic, etc., and arylacrylic, e.g., phenylacrylic, etc.), crotonic, oxalic, malonic, succinic, glutaric, adipic, pimelic, suberic, azelaic, sebacic, fumaric, citraconic, mesaconic, itaconic, acetylene dicarboxylic, aconitic, benzoic, phenylacetic, phthalic, terephthalic, benzoylphthalic, etc., acids; the saturated monohydride alcohol esters, e.g., the methyl, ethyl, propyl, isopropyl, butyl, sec.-butyl, amyl, etc., esters of unsaturated aliphatic monobasic and polybasic acids, illustrative examples of which appear above; vinyl cyclic compounds (including monovinyl aromatic hydrocarbons), e.g., styrene, o-, m-, and p- chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinylnaphthalenes, vinylcyclohexanes, vinylfuranes, vinylpyridines, vinyldibenzofuran, divinylbenzenes, trivinylbenzenes, allylbenzenes, diallylbenzenes, N-vinylcarbazole, the various allyl cyanostyrenes, the various alpha-substituted styrenes and alpha-substituted ring-substituted styrenes, e.g., alpha-methyl styrene, alpha-methyl-paramethyl styrene, etc.; unsaturated ethers, e.g., ethyl vinyl ether, diallyl ether, ethyl methallyl ether, etc.; unsaturated acids and anhydrides, e.g., acrylic and methacrylic acids, maleic anhydride, etc.; unsaturated amides, for instance N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.; butadienes, e.g., 1,3-butadiene, 2-chlorobutadiene, etc.; unsaturated polyhydric alcohol (e.g., butenediol, etc.) esters of saturated and unsaturated, aliphatic and aromatic, monobasic and polybasic acids, illustrative examples of which appear above; unsaturated glycidyl esters such as glycidyl acrylate, glycidyl methacrylate, glycidyl itaconate, glycidyl allyl phthalate, etc.

Still other examples of comonomers for copolymerization with an unsaturated borazole of the kind embraced by Formula I are the mono- and dialkyl (e.g., mono- and dimethyl to -octadecyl, inclusive) esters of maleic, fumaric, citraconic, mesaconic, and itaconic acids or their available anhydrides.

Other examples of monomers that can be copolymerized with the unsaturated borazole to produce our new copolymer compositions are the vinyl halides, more particularly vinyl fluoride, vinyl chloride, vinyl bromide, and vinyl iodide, and the various vinylidene compounds, including the vinylidene halides, e.g., vinylidene chloride, vinylidene bromide, vinylidene fluoride, and vinylidene iodide, other comonomers being added if needed in order to improve the compatibility and copolymerization characteristics of the mixed monomers.

Other and more specific examples of monomeric materials which can be mixed or blended with the unsaturated borazole, and the resulting homogeneous or substantially homogeneous, polymerizable composition then polymerized, as hereinafter more fully described, to yield new and valuable copolymer compositions are the different allyl compounds, especially those which have a boiling point of at least about 60° C. Of the monomeric materials which can be used the allyl esters form a large class, all of which are suitable. The reactive allyl compounds employed are preferably those which have a high boiling point such, for example, as diallyl maleate, diallyl fumarate, diallyl phthalate, diallyl succinate, etc. Other allyl compounds which are not necessarily high boiling also may be used.

More specific examples of allyl compounds that can be copolymerized with the unsaturated borazole are one or another or a plurality of the following (or a mixture thereof with another comonomer): allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl azelate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl phosphate, trimethallyl phosphate, tetrallyl silicate, hexallyl disiloxane, etc. Other examples of allyl compounds that may be employed are given in, for example, Kropa U.S. Patent No. 2,510,503, dated June 6, 1950.

Among the comonomers which are preferred for use in carrying our invention into effect are the vinyl compounds, including the vinyl aromatic compounds, more particularly the vinyl aromatic hydrocarbons (e.g., styrene, the various dialkyl styrenes, etc.), and the vinyl aliphatic compounds, e.g., acrylonitrile, acrylamide, etc., and other compounds containing a $CH_2=C<$ grouping, e.g., the various substituted acrylonitriles (e.g., methacrylonitrile, ethacrylonitrile, phenylacrylonitrile, etc.), the various substituted acrylamides (e.g., methacrylamide, ethacrylamide, the various N-substituted acrylamides and alkacrylamides, for instance, N-methylol acrylamide, N-monoalkyl and -dialkyl acrylamides and methacrylamides, e.g., N-monomethyl, -ethyl, -propyl, -butyl, etc. and N-dimethyl, -ethyl, -propyl, -butyl, etc., acrylamides and methacrylamides, N-monoaryl and -diaryl acrylamides and alkacrylamides, i.e., N-monophenyl and -diphenyl acrylamides and methacrylamides and methacrylamides, etc.), vinyl esters, e.g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e.g., methacrylic acid, ethacrylic acid, phenylacrylic acid, etc.) more particularly the alkyl esters of an acrylic acid, e.g., the methyl, ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids, including the alkyl acrylates containing not more than four carbon atoms in the alkyl grouping; examples of which are given above, as well as other vinyl aromatic and vinyl aliphatic compounds, and other compounds containing a $CH_2=C<$ grouping.

An unsaturated alkyd resin or a plurality of such resins also may constitute the unsaturated material which is copolymerized with one or more unsaturated borazoles of the kind embraced by Formula I to produce new and valuable copolymer compositions. Such resins are reaction products of a polyhydric alcohol and an unsaturated polycarboxylic acid or anhydride, and they contain a plurality of polymerizably reactive alpha,beta-enal groups, that is, the grouping

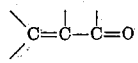

The unsaturated alkyd resins can be produced by various means, for example by the esterification of an unsaturated alpha,beta-polycarboxylic acid of the aliphatic series, more particularly an alpha,beta-unsaturated polycarboxylic acid, with a polyhydric alcohol, e.g., a glycol. The unsaturated alkyd resin employed as a co-reactant with the unsaturated borazole is preferably one having an acid number not greater than 50, although in some cases resins having an acid number as high as 100 may be employed. The term "unsaturated alkyd resin" as used herein does not include within its meaning the conventional drying oil or drying oil acid-modified alkyd resins in the preparation of which an aromatic or a saturated aliphatic polycarboxylic acid or anhydride is used.

Illustrative examples of unsaturated alkyd resins that may be employed are those produced by reaction of the following ingredients: ethylene glycol and maleic anhydride; glycerine and maleic anhydride; diethylene glycol, maleic anhydride and phthalic anhydride; diethylene glycol and itaconic acid; ethylene glycol, maleic anhydride and succinic acid; ethylene glycol, maleic anhydride and tetrafluorosuccinic acid; ethylene glycol, itaconic acid and phthalic anhydride; diethylene glycol, maleic anhydride and tung oil acids; ethylene glycol, maleic anhydride, linseed oil acids and phthalic anhydride; diethylene glycol and maleic anhydride; ethylene glycol, maleic anhydride and stearic acid; diethylene glycol, maleic anhydride and decyl alcohol; ethylene glycol, maleic anhydride, octyl alcohol and acetic anhydride; diethylene glycol, fumaric acid, tetrahydroabietyl alcohol and linseed oil fatty acids; alphapropylene glycol and maleic anhydride; diethylene glycol, fumaric acid and benzyl alcohol; diethylene glycol, fumaric acid and tetrahydroabietyl alcohol; ethylene glycol, fumaric acid and omega-hydroxydecanoic acid; diethylene glycol, fumaric acid and linseed oil fatty acid monoglycerides; etc. Reference is made to the following patents for more detailed information regarding the ingredients, the preparation, and additional examples of modified and unmodified unsaturated alkyd resins that may be copolymerized with the unsaturated borazole to yield new synthetic compositions having a wide variety of commercial applications: 2,409,633; 2,443,740; 2,443,741; 2,485,294; and 2,510,503.

Mixtures of any of the aforementioned polymerizable materials may be copolymerized with an unsaturated borazole of the kind embraced by Formula I. For example, one may copolymerize the aforesaid unsaturated borazole with an unsaturated alkyd resin alone, e.g., diethylene glycol maleate, etc., or, also alone, a compound containing a $—CH=C<$ grouping, more particularly a $CH_2=C<$ grouping (which compound is different from the unsaturated borazole), e.g., styrene, diallyl succinate, triallyl cyanurate, etc., or a mixture of such a resin and a compound containing a $—CH=C<$ grouping. Mixtures of different unsaturated alkyd resins and of different compounds containing a $—CH=C<$ grouping sometimes may be employed advantageously in making a copolymer thereof with the unsaturated borazole.

In the production of copolymers, the unsaturated borazole generally constitutes at least about 1% by weight of the mixture of copolymerizable materials, e.g., from 5% or 10% to 90% or 95%, or even as high as 98% or 99% by weight of the aforesaid mixture. The smaller proportions are generally employed when it is desired to impart a specific property or characteristic to the copolymer. For example, a small amount of the order of 1% to 10% of the unsaturated borazole may be incorporated into a polymerizable mass, containing one or more monomers that normally yield a linear polymer upon polymerization, in order to form a cross-linked polymerization product. In such applications the unsaturated borazole acts primarily as a cross-linking agent.

The copolymers of this invention will ordinarily have combined in the copolymer molecule from about 0.01 to about 50 mole percent of the unsaturated borazole and the other comonomer or comonomers constituting the remainder.

Any suitable means may be employed in effecting polymerization of the unsaturated borazole alone or admixed with one or more other unsaturated substances which are copolymerizable therewith. They are preferably polymerized under heat and while admixed with a polymerization catalyst, e.g., a free-radical initiator or catalyst (e.g., benzoyl peroxide or other organic peroxy compound, or an azo catalyst such, for instance, as alpha,alpha'-azodiisobutyronitrile).

Additional examples of peroxy type of free-radical catalysts are the various organic peroxy catalysts, illustrative examples of which latter are: the dialkyl peroxides, e.g., dipropyl peroxide, dibutyl peroxide, dilauryl peroxide, dioleyl peroxide, distearyl peroxide, di-(tert.-butyl) peroxide and di-(tert.-amyl) peroxide; the alkyl hydrogen peroxides, e.g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides, etc.; unsymmetrical or mixed diacyl peroxides, e.g., acetyl benzoyl peroxide, propionyl benzoyl peroxide, etc.; terpene oxides, e.g., ascaridole, etc.; urea peroxide; the various percarboxylic acids; the various percarbonates, persulfates, perborates, etc.; and others that will be apparent to those skilled in the art from the foregoing examples.

Additional examples of azo type of free-radical catalysts include the following:

Dimethyl alpha,alpha'-azodiisobutyrate
Alpha,alpha'-azobis (alpha-methylbutyronitrile)
Alpha,alpha'-azobis (alpha-ethylbutyronitrile)
1,1'-azodicyclopentanecarbonitrile Reference is made to Hunt U.S. Patent No. 2,471,959, dated May 31, 1949, for additional examples and for a generic description of compounds of this class.

Depending upon the particular monomeric mixture employed there may also be used to initiate polymerization, in addition to free-radical catalysts of the above types or kinds, ionizing radiations, ultra-violet light, ionic (including cationic and anionic) catalysts, etc. Examples of cationic catalysts are p-toluene sulfonic acid, sulfuric acid, phosphoric acid, aluminum chloride, stannic chloride, titanium tetrachloride, boron trifluoride, boron trifluoride-ethyl etherate and other Lewis-type catalysts, more particularly Friedel-Crafts catalysts. Examples of anionic catalysts are metallic sodium and potassium, a potassium-naphthalene complex, amylsodium, amylpotassium, and the like.

The mixture of copolymerizable ingredients can be polymerized in emulsion or in solution state to yield a copolymer. Various inert organic solvents or diluents also may be employed, the choice depending upon the particular comonomer and catalyst used and among which may be mentioned: benzene, toluene, xylene, dioxane, n-heptane, tetrahydrofuran, methylene chloride, ethylene dichloride, anhydrous acetone, as well as other. When the reaction is effected in solution state, a temperature at or approaching the boiling temperature of the solution may be used if desired. The copolymer is then separated from the liquid medium (solvent or diluent) in which polymerization was effected by any suitable means, e.g., by filtration, centrifuging, solvent extraction, evaporation of the solvent or diluent, etc.

The polymerization can be effected continuously, semi-continuously or by a batch operation. Bulk or mass polymerization technique can be used; or polymerization can be effected in a solvent which is capable of dissolving the polymerizable substance and in which the latter is preferably inert; or in a liquid medium in which the polymerizable substance is soluble but the copolymer is insoluble; or by bead polymerization technique. The polymerization can be effected at atmospheric or at superatmospheric pressures, as desired or as conditions may require.

As indicated hereinbefore, a catalyst or catalytic influence is required in order to initiate the polymerization or if polymerization is to be effected in a reasonable or practical period of time. The concentration of catalyst employed varies considerably. Thus, depending upon the particular catalyst used, and the kind and amount of copolymerizable substance that is being copolymerized with the unsaturated borazole, it may range from, for example, about 0.5 part or 1 part by weight of catalyst per thousand parts by weight of the polymerizable substance to a molar ratio of catalyst/polymerizable substance equal to or greater than 1.

The temperature of polymerization of the polymerizable substance or composition, at atmospheric or superatmospheric pressure, and under a catalytic influence such as that provided by an added polymerization initiator, can be varied over a wide range up to and including or slightly above the boiling point (at atmospheric pressure) of the mass (or of the lowest boiling component thereof), but should be below the decomposition temperature of the monomeric material or materials (i.e., the polymerizable composition). In most cases, the polymerization temperature will be within the range of 15° C. to 150° C., more particularly within the range of 20°–30° C. (ordinary room temperature) to about 130° C., depending upon the particular polymerizable composition being polymerized, the particular catalyst used, the rapidity of polymerization wanted, and other influencing factors. With certain ionic catalysts, e.g., gaseous $BF_3$, a boron trifluoride-ethyl ether complex, concentrated sulfuric acid, anhydrous aluminum chloride, etc., a substantially lower polymerization temperature often advantageously may be used, e.g., temperatures ranging between —80° C. and 0° C. or +10° C. At the lower temperatures below the solidification point of the mixture containing the unsaturated borazole and one or more other polymerizable substances, polymerization is usually effected while the polymerizable composition is dissolved or dispersed in a solvent or dispersion medium which is liquid at the polymerization temperature. The polymeric material is then separated from the liquid medium in which polymerization was effected by any suitable means, for example by techniques such as those mentioned hereinbefore for purposes of illustration.

In order that those skilled in the art may better understand how the present invention can be carried into effect, the following examples are given by way of illustration and not by way of limitation. All parts and percentages are by weight unless otherwise stated.

EXAMPLE 1

A. *Preparation of B,B',B''-trichloro-N,N',N''-triphenyl-borazole*

A three-necked, 500 ml. flask equipped with stirrer, Dry Ice condenser, and a Claisen head provided with a nitrogen inlet tube and a "Drierite" drying tube is charged with 200 ml. of toluene (freshly distilled over sodium or preferably calcium hydride) and cooled in an ice-water bath while being swept with dry nitrogen. Boron trichloride (50 g.; 0.43 mole; slightly more than one equivalent to take care of slight loss due to hydrolysis) is distilled into the flask through the Dry Ice condenser, causing a brownish-purple color to develop in the toluene solution. After replacing the drying-tube with an addition funnel and protecting the exit of the condenser from moisture by a drying tube, a solution of aniline (30.4 g.; 0.326 mole) in toluene (100 ml.) is added dropwise with stirring over a one-hour period. An immediate precipitate of the addition compound $$(C_6H_5—NH_2:BCl_3)$$

separates from the purple-colored solution. The cooling bath is replaced by a heating mantle; the Dry Ice condenser is also replaced by a water condenser, the outlet of which is connected by a rubber tubing to an inverted funnel held about 4 cm. above a beaker of water. The reaction mixture is then refluxed until evolution of HCl and $BCl_3$ has ceased (24 hours). During this period, the color of the solution changes from purple to a light brown. The solvent is slowly removed by distillation until the product begins to separate from solution. After allowing the mixture to cool to room temperature, the crystalline, almost colorless product is collected by rapid filtration. Yield: 32.6 g. (73%). A small portion recrystallized from dry benzene (filtered through glass wool) has M.P. 270°–272° C.; Jones and Kinney (J.A.C.S. 61, 1378 [1939]) report M.P. 265°–270° C. Since the compound is quite susceptible to hydrolysis by moisture, it should be protected from moisture, e.g., by storing in a desiccator over a suitable drying agent or in a container to which enough benzene or toluene is added to wet the solid.

EXAMPLE 2

*Preparation of B,B',B''-trivinyl-N,N',N''-triphenylborazole*

Vinyl magnesium bromide is prepared by slowly adding a solution of vinyl bromide (15.4 ml.; 0.218 mole) in tetrahydrofuran (50 ml.) to a suspension of magnesium (5.3 g.; 0.218 g. atom) in tetrahydrofuran (100 ml.). The resulting solution is then added dropwise over a 1 hour period to a suspension of 15 g. (0.0364 mole) of B-trichloro-N-triphenylborazole in 100 ml. of tetrahydrofuran. After refluxing for 1½ to 2 hours, the tetrahydrofuran is stripped off under vacuum and the light brown solid which results is taken up in hot hexane. The hexane solution is washed with a small amount of water, dried, and concentrated to about 75 ml. A white, crystalline product comprising B,B',B''-trivinyl-N,N',N''-triphenylborazole separates on cooling and this is collected by filtration. The mother liquor furnishes additional product. Total weight: 6.3 g., yield: 51%.

The melting point of an analytical sample obtained by recrystallizing the less pure product from hexane is 174°–176° C.

| | C | H | B | N |
|---|---|---|---|---|
| Analysis: | | | | |
| Calc. for $C_{24}H_{24}B_3N_3$, percent | 74.47 | 6.26 | 8.39 | 10.86 |
| Found, percent | 73.87 | 6.82 | | 11.40 |
| | 74.77 | 6.47 | 8.22 | 11.11 |

Using vinyl magnesium bromide as the Grignard reagent, essentially the same procedure is followed as described under Example 2 in preparing other vinyl-substituted borazoles (all of which are embraced by Formula I), using amounts of the vinyl magnesium bromide and of the halogenoborazole equivalent to those employed in Example 2. The halogenoborazole reactants and products are shown in Table I hereafter given. From fair to good yields of product are obtained in the individual case.

EXAMPLE 3

| | Parts | Approx. Weight Percent | Approx. Molar (Mole) Percent |
|---|---|---|---|
| B-trivinyl-N-triphenylborazole | 37.8 | 79.4 | 50.0 |
| Methyl methacrylate | 9.8 | 20.6 | 50.0 | are dissolved in 111 parts of chlorobenzene together with 0.6 part of a free-radical polymerization catalyst, specifically alpha,alpha'-azodiisobutyronitrile. The mixture is placed in a heavy-walled glass tube, which is thoroughly deaerated, sealed under vacuum, and placed in a 70° C. bath. After 1½ hours at this temperature, the tube is cooled and the reaction mass is added to 500 ml. methanol to precipitate the copolymer of B-trivinyl-N-triphenylborazole and methyl methacrylate.

TABLE I

| Halogenoborazole | Product |
|---|---|
| B,B',B''-trichloroborazole | B,B',B''-trivinylborazole. |
| B,B',B''-trichloro-N,N',N''-triethylborazole | B,B',B''-trivinyl-N,N',N''-triethylborazole. |
| B,B',B''-trichloro-N,N',N''-tritolylborazole | B,B',B''-trivinyl-N,N',N''-tritolylborazole. |
| B,B',B''-trichloro-N,N',N''-tribenzylborazole | B,B',B''-trivinyl-N,N',N''-tribenzylborazole. |
| B,B',B''-trichloro-N,N',N''-tricyclohexylborazole | B,B',B''-trivinyl-N,N',N''-tricyclohexylborazole. |

The product is collected by filtration, and after drying gives 22 parts (46% yield) of material in the form of a white powder. Analysis of this copolymer shows 8.22% nitrogen, representing 44 mole percent of B-trivinyl-N-triphenylborazole. This copolymer softens at ca. 155° C. but is not completely liquefied even up to 200° C. It forms clear, somewhat brittle films. The copolymer is soluble in chloroform and benzene.

EXAMPLE 4

Same as in Example 3, except that the reaction is allowed to continue for 4 hours. At the end of this period, the reaction mass is completely gelled. The copolymer is removed, ground up in methanol, and isolated by filtration to give a white, solid powder. This copolymer is not soluble in chloroform or benzene and does not liquefy at temperatures up to 300° C. It is evident that this is a cross-linked copolymer. This illustrates the use of B-trivinyl-N-triphenylborazole as a cross-linking or gelling agent in conjunction with other monomers.

EXAMPLE 5

| | Parts | Approx. Weight Percent | Approx. Molar Percent |
|---|---|---|---|
| B-trivinyl-N-triphenylborazole | 37.8 | 78.8 | 50.0 |
| Styrene | 10.2 | 21.2 | 50.0 | are dissolved in 111 parts of chlorobenzene together with 0.06 part of alpha,alpha'-azodiisobutyronitrile. Copolymerization of the monomers and isolation of the copolymer are effected as described under Example 3 with the exception that the time of heating is 6 hours instead of 1½ hours. The dried copolymer is a white, powdery solid, which softens at 145° C. and melts at 150°–160° C., with only slight discoloration up to 300° C. The copolymer is soluble in chloroform and benzene. Nitrogen analysis indicates that the copolymer contains approximately 37 mole percent of B-trivinyl-N-triphenylborazole.

EXAMPLE 6

| | Parts | Approx. Weight Percent | Approx. Molar Percent |
|---|---|---|---|
| B-trivinyl-N-triphenylborazole | 37.8 | 81.8 | 50.0 |
| Vinyl acetate | 8.4 | 18.2 | 50.0 | are dissolved in 111 parts of chlorobenzene together with 0.6 part of alpha,alpha'-azodiisobutyronitrile. Copolymerization of the monomers and isolation of the copolymer are effected as described under Example 3, with the exception that the period of heating is 24 hours instead of 1 hour and the temperature is 80° C. instead of 70° C. This copolymer is a white, powdery solid which does not melt on heating to 300° C. and shows little discoloration. Nitrogen analysis indicates that the copolymer contains approximately 50 mole percent of B-trivinyl-N-triphenylborazole.

Examples 3, 4, 5, and 6 illustrate the relative ease of copolymerization of B-trivinyl-N-triphenylborazole with three different ethylenically unsaturated monomers, vis., methyl methacrylate, styrene, and vinyl acetate. However, when an attempt is made to homopolymerize B-trivinyl-N-triphenylborazole in a similar manner, no homopolymer is obtained. For example, when a solution of 1 ml. of chlorobenzene containing 0.15 g. of B-trivinyl-N-triphenylborazole and 0.005 g. of benzoyl peroxide is kept at 80° C. for 24 hours in a thoroughly deaerated tube sealed under vacuum, no homopolymer is formed; also, following a similar procedure with alpha,alpha'-azodiisobutyronitrile at 130° C., and using larger amounts of di-t.-butyl peroxide at 130° C. and 150° C., no homopolymer is obtained. The inability of this monomer to homopolymerize under the described conditions is probably due to "blocking" of the vinyl groups by the relatively large phenyl groups attached to the ring nitrogen atoms.

EXAMPLE 7

|  | Parts | Approx. Molar Percent |
|---|---|---|
| B-trivinylborazole | 5.5 | 35 |
| Diallyl phthalate | 16.0 | 65 |
| Di-tert.-butyl peroxide | 0.8 | | are mixed together and placed in a polymerization tube. After deaeration, the tube is sealed under vacuum and placed in a 130° C. oven for 30 hours. The resulting copolymer of B-trivinylborazole and diallyl phthalate is a hard, slightly yellow solid when cold.

Dyes, pigments, opacifiers, lubricants, plasticizers, fillers, and other effect agents can be incorporated into the copolymer of this example to provide molding compositions from which can be produced molded articles suitable for a wide variety of industrial and domestic applications.

EXAMPLE 8

|  | Parts | Approx. Molar Percent |
|---|---|---|
| B-trivinyl-N-tritolylborazole | 12.7 | 30 |
| Ethyl acrylate | 7.0 | 70 |
| Chlorobenzene | 20.0 | |
| D-tert.-amyl peroxide | 0.8 | | are heated together under reflux at the boiling temperature of the mass for 24 hours. At the end of this period of time, the product is a viscous mass containing a copolymer of ethyl acrylate and B-trivinyl-N-tritolylborazole. Films dried from the benzene solution of the copolymer are tough. The copolymer of this example is suitable for use as a component of coating compositions.

Instead of ethyl acrylate other comonomers, more particularly other esters of acrylic acid, e.g., methyl acrylate, propyl acrylate, isopropyl acrylate, n-butyl acrylate, isobutyl acrylate, sec.-butyl acrylate, tert.-butyl acrylate, amyl acrylate, hexyl acrylate, propenyl acrylate, cyclohexyl acrylate, phenyl acrylate, benzyl acrylate, etc., can be substituted in the above formulation, thereby to obtain copolymer compositions of varying properties. As with ethyl acrylate, so too with such other comonomers the proportions of components can be varied as desired or as conditions may require, e.g., within ranges such as those mentioned in the portion of this specification prior to the examples.

EXAMPLE 9

A mixture of the various isomers of methylstyrene (128 g., 99.9 mole percent) and B-trivinyl-N-tribenzylborazole (0.426 g., 0.1 mole percent), together with 1 g. of benzoyl peroxide, is heated to 80° C. for 24 hours. The solution is then poured into 1 liter of cold methanol. The resulting copolymer of methylstyrene and B-trivinyl-N-tribenzylborazole is removed by filtration, washed and dried. The dried copolymer, alone or with a dye, pigment, filler, plasticizer, lubricant, or other modifying agent, may be molded under heat and pressure, e.g., at 140° C. to 170° C. and under a pressure of 2000 to 5000 pounds per square inch.

The copolymer of this example in solution in, for example, methyl ethyl ketone, may be used as a coating composition or as a component of such compositions. For example, it may be applied to a surface of glass, metal, wood, or other material to be protectively finished, and the coated article then heated for from 1 to 3 hours at a temperature of the order of 100° C. to 120° C. to evaporate the solvent and to solidify the coating thereon.

EXAMPLE 10

|  | Parts | Approx. Molar Percent |
|---|---|---|
| Acrylonitrile | 88 | 87 |
| N-vinyl-2-oxazolidone | 22 | 10 |
| B-trivinyl-N-triethylborazole | 10 | 3 |
| Alpha,alpha'-azodiisobutyronitrile | 3 | | are mixed, degassed, and then heated for 48 hours in a sealed vessel placed in an oven maintained at 60° C. A nearly colorless solid mass comprising a ternary polymer of acrylonitrile, N-vinyl-2-oxazolidone and B-trivinyl-N-triethylborazole is obtained at the end of this period of time.

EXAMPLE 11

|  | Parts | Approx. Molar Percent |
|---|---|---|
| B-trivinyl-N-tritolylborazole | 32.0 | 75 |
| 2,5-dichlorostyrene | 4.3 | 25 |
| Chlorobenzene | 100.0 | |
| Alpha,alpha'-azodiisobutyronitrile | 1.0 | | are mixed and copolymerized as in Example 3, with the exception that the time of heating is 12 hours instead of 1½ hours. The resulting solid, thermoplastic copolymer is useful as a modifier of other thermoplastic polymers (e.g., polystyrene) to raise the softening temperature thereof; or it may be blended with any of the various condensation polymers, e.g., nylon, urea resins, melamine resins, urea-melamine resins, phenolic resins, etc., to modify the properties of the latter.

EXAMPLE 12

|  | Parts | Approx. Molar Percent |
|---|---|---|
| B-trivinyl-N-triethylborazole | 8.0 | 33.3 |
| Diallyl succinate | 6.6 | 33.3 |
| Triallyl cyanurate | 8.3 | 33.3 |
| Benzoyl peroxide | 0.2 | | are mixed and heated slowly over a period of 2 hours to 110° C., and then for 3 hours at 110° C., yielding a hard, resinous, ternary polymer.

EXAMPLE 13

|  | Parts | Approx. Molar Percent |
|---|---|---|
| B-trivinyl-N-triethylborazole | 2.40 | 10.0 |
| Methyl acrylate | 3.90 | 45.0 |
| Methyl methacrylate | 4.50 | 45.0 |
| Alpha,alpha'-azodiisobutyronitrile | 0.01 | | are mixed together and charged to a heavy-walled glass tube, which thereafter is sealed under vacuum. Copolymerization is effected by heating the sealed tube in a 60° C. water bath for 48 hours and then in an oil bath as follows: 18 hours each at 90° C., 110° C., 130° C., and 150° C. The resulting ternary polymer of B-trivinyl-N-triethylborazole, methyl acrylate and methyl methacrylate can be molded under heat and pressure to yield a wide variety of molded articles for domestic and industrial uses.

EXAMPLE 14

|  | Parts | Approx. Molar Percent |
| --- | --- | --- |
| B-trivinylborazole | 1.56 | 1 |
| Methacrylonitrile | 67.00 | 99 |
| Alpha,alpha'-azodiisobutyronitrile | 0.07 |  | are mixed together and charged to a heavy-walled glass tube, which thereafter is sealed under vacuum. Copolymerization is effected by heating the sealed tube for 48 hours as described under Example 3, yielding a solid copolymer of B-trivinylborazole and methacrylonitrile.

EXAMPLE 15

|  | Parts | Approx. Molar Percent |
| --- | --- | --- |
| B-trivinyl-N-tricyclohexylborazole | 2.0 | 5 |
| Vinylidene chloride | 9.0 | 95 |
| Benzoyl peroxide | 0.1 |  | are mixed and heated together in a closed vessel for 24 hours at 70° C., and for another 24 hours at 80° C., yielding a solid, thermoplastic copolymer of vinylidene chloride and the said vinylborazole. This copolymer can be hot drawn to obtain monofilaments, rods, bars, tubes, etc., having a wide variety of commercial uses.

EXAMPLE 16

|  | Parts | Approx. Molar Percent |
| --- | --- | --- |
| B-trivinyl-N-tribenzylborazole | 8.5 | 20 |
| Vinyl propionate | 8.0 | 80 |
| Benzene | 20.0 |  |
| Alpha,alpha'-azodiisobutyronitrile | 0.2 |  |

The homogeneous solution of the above comonomers is refluxed for 14 hours. At the end of this time, the solvent and unreacted vinyl propionate are removed by vacuum evaporation. A solid copolymeric mass is obtained.

EXAMPLE 17

|  | Parts | Approx. Molar Percent |
| --- | --- | --- |
| B-trivinyl-N-tritolylborazole | 3.02 | 70 |
| Vinyl acetate | 0.43 | 15 |
| Vinyl formate | 0.11 | 15 |
| Benzoyl peroxide | 0.03 |  |
| Chlorobenzene | 5.5 |  |

Exactly the same procedure is followed as described under Example 6 in carrying out the copolymerization reaction with the exception that the time the reaction tube is heated at 80° C. is about 30 hours instead of 24 hours. At the end of the reaction period, the reaction mass containing a ternary polymer of vinyl formate, vinyl acetate, and B-trivinyl-N-tritolylborazole is precipitated by pouring into 100 ml. of petroleum ether. The ternary polymer is filtered off, washed with petroleum ether, and dried at room temperature. It is useful, for example, as a modifier of other synthetic resins, e.g., urea-formaldehyde, melamine-formaldehyde and urea-melamine-formaldehyde resins.

EXAMPLE 18

Same as in Example 16 with the exception that 35 molar percent each of B-trivinyl-N-triphenylborazole and B-trivinyl-N-tritolylborazole are substituted for 70 molar percent of B-trivinyl-N-tritolylborazole. Similar results are obtained.

EXAMPLE 19

A mixture comprising 65 parts of an unsaturated alkyd resin obtained by reaction between ethylene glycol, diethylene glycol and fumaric acid, 35 parts of B-trivinylborazole, and 2 parts of di-tert.-butyl peroxide is poured into a mold and cured therein for 10 hours at 100° C., 5 hours at 120° C., and 2 hours at 140° C. A hard, well-cured casting is obtained.

EXAMPLE 20

Forty-five (45) parts of ethylene glycol fumarate sebacate (4:3:1 molar ratio) is mixed with 15 parts B-trivinyl-N-tritolylborazole. To 18 parts of the resulting mixture are added 12 parts of wood flour filler and 2.25 parts of benzoyl peroxide containing 50% inactive filler (triphenyl phosphate). The resulting mixture is compacted by passage through cold rolls and disintegrated. The finely divided material thereby obtained is then placed in a disk mold preheated to 140° C., and left there under a pressure of about 3,500 pounds per square inch for about 30 minutes. The resulting molding is hard and well cured.

EXAMPLE 21

Seventy (70) parts of diethylene glycol fumarate sebacate (6:5:1 molar ratio), 30 parts of B-trivinylborazole, 8 parts of paraformaldehyde, and 2 parts of benzoyl peroxide containing 50% inactive filler (triphenyl phosphate) are thoroughly mixed together in a suitable vessel and then heated at 100° C. A vigorous reaction occurs, accompanied by evolution of gas. As the mass polymerizes and sets, it expands to yield a cured, porous mass.

EXAMPLE 22

A uniform mixture of 30 parts of ethylene glycol fumarate sebacate (4:3:1 molar ratio), 12 parts of B-trivinyl-N-tritolylborazole, and 0.6 part of di-tert.-amyl peroxide is spread evenly between five plies of ECC–11–112 Fiberglas cloth and the combination is held under slight pressure in a Carver press for about 45 minutes at about 150° C. The resinous copolymer component of the impregnated Fiberglas cloth becomes hard and the panel stiff.

EXAMPLE 23

The resin mixture of Example 22 is spread evenly between six plies of #720 paper, and the combination is subjected to the same curing conditions as the Fiberglas laminate of Example 22. The resulting panel is stiff, and the paper laminate is well-cured.

EXAMPLE 24

A substantially homogeneous mixture is made of 50 parts of B-trivinyl-N-triphenylborazole and 100 parts of an unsaturated alkyd resin produced by reaction of the following reactants in the specified molar ratios:

| | Molar ratio |
| --- | --- |
| Propylene glycol | 6.6 |
| Phthalic anhydride | 4.0 |
| Fumaric acid | 2.6 |

The reaction between the alkyd-forming reactants is carried out in the presence of 0.008% of hydroquinone based on the weight of the alkyd.

To the mixture of the aforementioned vinyl-substituted borazole and unsaturated alkyd resin is added 1 part of a polymerization catalyst comprising 60% methyl ethyl ketone hydroperoxide and 40% dimethyl phthalate as a solvent therefor; and, also, 0.4 part cobalt naphthenate solution, which is a xylene solution of cobalt naphthenate containing 2% cobalt as the metal.

A sample of the polymerizable composition produced as above described is heated at 75° C. for about 30 hours, yielding a hard copolymer of the unsaturated alkyd resin and B-trivinyl-N-triphenylborazole.

EXAMPLE 25

|  | Parts | Approx. Molar Percent |
|---|---|---|
| Diethylene glycol fumarate sebacate [1] | 270.0 | 13 |
| N,N-diallylmelamine | 90.0 | 57 |
| B-trivinyl-N-tricyclohexylborazole | 90.0 | 30 |
| Di-tert.-butyl peroxide in solution in 10 parts dimethyl phthalate | 2.5 | |

[1] This unsaturated alkyd resin is prepared by effecting reaction between 6 moles diethylene glycol, 5 moles fumaric acid, and 1 mole sebacic acid.

The above ingredients are mixed while warming on a steam bath to insure complete distribution of the solution of the peroxide catalyst and to obtain a homogeneous mass. A 2-ply laminated article having high heat resistance is made by curing, between glass plates, two superimposed sheets of glass cloth that are impregnated with the above polymerizable composition, for 4 hours at 125° C. and at contact pressure. The laminate is completely cured, hard, compact, and flexible. The ternary polymer of diethylene glycol fumarate sebacate, N-N-diallylmelamine and B-trivinyl-N-tricyclohexylborazole, which is produced in situ, fills the interstices of the sheets of glass cloth.

EXAMPLE 26

Same as in Example 24 with the exception that the unsaturated alkyd resin is one which is produced by reaction of the following reactants in the specified molar ratios:

Molar ratio
Propylene glycol _____ 6.6
Phthalic anhydride _____ 1.1
Fumaric acid _____ 5.5 and 1.0 part of the same catalyst used in Example 24 is employed. The reaction between the alkyd-forming reactants is carried out in the presence of 0.06% of di-(tert.-butyl) hydroquinone based on the weight of the original reactants forming the alkyd resin.

A sample of the polymerizable composition is heated on a steam bath at 100° C., a hard copolymer of the unsaturated alkyd resin and B-trivinyl-N-triphenylborazole is obtained after heating for 90 minutes.

It will be understood, of course, by those skilled in the art that my invention is not limited to the specific ingredients named in the above illustrative examples nor to the particular proportions and method of copolymerization mentioned therein. For example, in place of the particular vinylborazole specified in the individual example, one may use any other vinylborazole of the kind embraced by Formula I or mixtures thereof in any proportions. Also, in place of all or part of the particular co-reactant named in the individual example, one can use one or more other compounds containing a >C=C< grouping, more particularly a —CH=C< grouping, and still more particularly a $CH_2$=C< grouping with or without an unsaturated alkyd resin, numerous examples of which have been given hereinbefore.

The thermoplastic and thermosetting (or potentially thermosetting) polymerization products of this invention have a wide variety of applications. For instance, with or without a filler or other additive, numerous examples of which have been given hereinbefore, they may be used as molding compositions (or as components of molding compositions) from which molded articles are produced by molding the composition under heat and pressure, e.g., at temperatures of the order of 120° C. to 200° C. and under pressures ranging between 1,000 and 10,000 pounds per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions used in producing the copolymers of this invention also can be used in the production of castings; as adhesives, for instance as binders for paper, glass, wood, rubber, etc.; in the treatment of paper or paper stock; and for various other purposes including those mentioned in some of the specific examples, and in the portion of this specification prior to the examples.

In a manner similar to that described hereinbefore with reference to the production of copolymers of the kind embraced by Formula I, one also may prepare polymerization products of compounds represented by the general formula

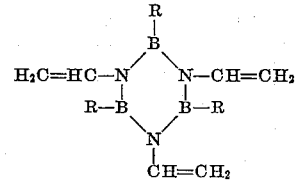

where R has the same meaning as given hereinbefore with reference to Formula I.

I claim:

1. A composition comprising a copolymer of different, copolymerizable ingredients comprising (1) a compound represented by the general formula

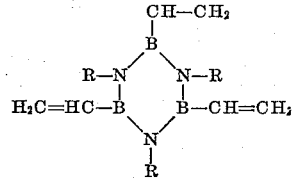

where R represents a member of the class consisting of hydrogen and alkyl, aralkyl, aryl, and alkaryl radicals, and (2) at least one member of the class consisting of (a) monomers having a $CH_2$=C< grouping and (b) polymerizable unsaturated alkyd resins obtained by a condensation reaction of ingredients comprising an aliphatic polyhydric alcohol and an ethylenically unsaturated, aliphatic, polycarboxylic acid, the ingredients of (1) and (2) being employed in the ratio of from 0.1 to 75 molar percent of the former to from 99.9 to 25 molar percent of the latter.

2. A composition comprising a copolymer as in claim 1 wherein the compound of (1) is B,B',B''-trivinyl-N,N',N''-triphenylborazole.

3. A composition comprising a copolymer as in claim 1 wherein the substance of (2) is styrene.

4. A composition comprising a copolymer as in claim 1 wherein the substance of (2) is a vinyl ester.

5. A composition comprising a copolymer as in claim 4 wherein the substance of (2) is vinyl acetate.

6. A composition comprising a copolymer as in claim 1 wherein the substance of (2) is an alkyl ester of methacrylic acid.

7. A composition comprising a copolymer as in claim 6 wherein the alkyl ester of methacrylic acid is methyl methacrylate.

8. A composition comprising a copolymer of different, copolymerizable ingredients comprising (1) B,B',B''-trivinyl-N,N',N''-triphenylborazole and (2) a monomer containing a $CH_2$=C< grouping, the ingredients of (1) and (2) being employed in the ratio of from 1 to 70 molar percent of the former to from 99 to 30 molar percent of the latter.

9. A composition comprising a copolymer as in claim 8 wherein the substance of (2) is a vinyl compound, 10. A composition comprising a copolymer as in claim 9 wherein the vinyl compound is a vinyl aromatic compound.

11. A composition comprising a copolymer as in claim 10 wherein the vinyl aromatic compound is styrene.

12. A composition comprising a copolymer as in claim 9 wherein the vinyl compound is a vinyl aliphatic compound.

13. A composition comprising a copolymer as in claim 12 wherein the vinyl aliphatic compound is vinyl acetate.

14. A composition comprising a copolymer of copolymerizable ingredients comprising (1) B,B',B''-trivinyl-N,N',N''-triphenylborazole and (2) methyl methacrylate, the ingredients of (1) and (2) being employed in the ratio of from 1 to 70 molar percent of the former to from 99 to 30 molar percent of the latter.

References Cited in the file of this patent

UNITED STATES PATENTS

| | | |
|---|---|---|
| 2,517,944 | Upson | Aug. 8, 1950 |
| 2,754,177 | Gould | July 10, 1956 |
| 2,821,463 | Scott et al. | Jan. 28, 1958 |

OTHER REFERENCES

Groszos et al.: ACS, 131st Meeting-Abstracts of Papers, page 53-0, April 7 to 12, 1957.

UNITED STATES PATENT OFFICE

CERTIFICATION OF CORRECTION

Patent No. 2,954,366 September 27, 1960

Joseph J. Pellon

It is hereby certified that error appears in the above numbered patent requiring correction and that the said Letters Patent should read as corrected below.

Column 1, line 40, for "proply" read -- propyl --; line 63, for "tetralyl" read -- tetrallyl --; column 5, line 32, for "i.e." read -- e.g. --; line 34, strike out "and methacrylamides"; column 7, line 38, for "Friedel-Crafts" read -- Friedel-Craft --; column 15, line 28, for "N-N-diallylmela- read -- N,N-diallylmela- --; column 16, line 42, for "aralykyl" read -- aralkyl --.

Signed and sealed this 25th day of April 1961.

(SEAL)
Attest:

ERNEST W. SWIDER
Attesting Officer

DAVID L. LADD
Commissioner of Patents